United States Patent [19]
Berryman

[11] 3,747,233
[45] July 24, 1973

[54] THERAPEUTIC WALKING APPARATUS
[76] Inventor: Carlene Berryman, 2405 Monterey Dr., Apt. 20, Madison, Wis. 53704
[22] Filed: Mar. 29, 1972
[21] Appl. No.: 239,227

[52] U.S. Cl. .................................. 35/29 R, 272/70
[51] Int. Cl. ............................................ A63b 23/04
[58] Field of Search ................ 35/29 R, 29 A, 29 C, 35/29 D, 29 E, 69; 46/175 R; 272/70; 273/1 A; 116/139

[56] References Cited
UNITED STATES PATENTS

| | | | |
|---|---|---|---|
| 1,207,191 | 12/1916 | Madden | 340/323 X |
| 1,815,443 | 7/1931 | Mitchell | 35/29 C |
| 2,158,475 | 5/1939 | Montine | 35/29 C |
| 2,238,035 | 4/1941 | Char | 46/175 R |
| 2,690,789 | 10/1954 | Zodrozny | 272/70 |
| 3,091,454 | 5/1963 | Sam | 273/1 A |
| 3,139,281 | 6/1964 | Nicholson | 273/1 A |

OTHER PUBLICATIONS

"Whoopee Cushion," Johnson Smith & Co., Detroit. page 473, rec'd August, 1950,

Primary Examiner—Harland S. Skogquist
Attorney—Joseph G. Werner et al.

[57] ABSTRACT

A therapeutic walking board for teaching basic walking skills to mentally retarded and physically handicapped individuals who have difficulty with coordinated physical movements. The apparatus comprises an elongate flat walkway board with a removable and vertically adjustable handrail assembly. A plurality of substantially raised resilient footprint forms are releasably adhered in a desired walking pattern on the board. An air-operated sound-emitting device is embedded in each footprint form for actuation upon compression of the form. The apparatus is collapsible for storage.

1 Claim, 2 Drawing Figures

PATENTED JUL 24 1973　　　　　　　　　　　　　　　　　　　　3,747,233

THERAPEUTIC WALKING APPARATUS

BACKGROUND OF THE INVENTION

1. Field of the Invention

This invention relates generally to educational-developmental training devices and more particularly to a specialized therapeutic walking device designed for developing basic walking skills in mentally retarded and physically handicapped individuals.

2. Description of the Prior Art

Generally, the devices presently in use comprise a flat walkway with permanently attached angularly adjustable footprint forms. Each form contains at least one electrical contact which closes when an individual steps on the form thereby activating sound and visual indicia on a console at the end of the walkway. The remote visual indicia, usually console lights, are position coordinated with the footprint forms on the walkway and accumulate to facilitate performance evaluation.

SUMMARY OF THE INVENTION

My therapeutic walking apparatus is an educational-developmental training device for use with the mentally retarded and physically handicapped individuals whose need to learn, develop and improve physical skills is of significant importance. The apparatus is particularly useful for developing walking skills in such individuals which can lead to the improvement of coordination and balance, perceptual-motor performance, physical fitness and gait. However, the device can also be used by the aged as an exercise device and by normal children who do not suffer from difficulties of coordinated physical movements or fun and recreation. The apparatus can be used indoors or outdoors by institutions such as childrens' hospitals, schools, training centers, nursing homes and the like.

The apparatus has several design features which are important for use with the mentally retarded and the physically handicapped. First, the footprint forms are releasably secured preferably by an adhesive on the walkway board and therefore can be arranged in any desired individual walking pattern. This is particularly advantageous in training the mentally retarded because it allows the task to be tailored to an individual's ability and to be made progressively more challenging so that the individual can develop at his own rate. Furthermore, this feature allows children, retarded and normal, to use the device as a fun game by adjusting the forms to long and short strides and comparing the time it takes to walk or run frontwards or backwards on the forms successfully.

Secondly, the device encourages the individual to duplicate the pre-arranged desired walking pattern. Learning is stimulated in that the individual receives immediate positive gratification by a sound emitted from each footprint form when he steps on it as he correctly walks the pre-arranged pattern. For the mentally retarded and physically handicapped it is important that the sound emanate from the footprint form on which the individual has just placed his foot rather than from a somewhat remote location which the individual may not be capable of mentally connecting to his immediate endeavor and accomplishment.

Thirdly, the footprint forms are raised substantially above the walkway board, preferably about 3 to 5 inches, to prevent the individual from shuffling his feet while performing the task. The individual must volantarily lift his leg and foot and place it correctly down on the footprint form to receive the immediate sound gratification. If the footprint forms are substantially less than 3 inches high, the individual may be able to obtain the sound gratification by shuffling or sliding his feet onto the footprint forms and therefore not be forced to develop an improved gait.

Further, the walkway board is provided with a removable and vertically adjustable handrail assembly on one or both sides of the board to assist one in walking the pattern. The vertical adjustability of the handrail assembly permits it to be set at a desired elevation to meet individual requirements. In addition, the second half of the handrail assembly on each side may be removed whereby the individual would then be provided with the handrail assist only over the first half of the walkway. As his development progresses, the handrail assemblies may be removed completely.

The walkway board is hinged at the middle so that it may be folded to one-half its length after removal of the handrail assemblies for storate and transporting.

Further objects, features and advantages of my invention will be apparent from the detailed description taken in conjunction with the accompanying drawings showing a preferred embodiment exemplifying the principles of the invention.

DESCRIPTION OF A PREFERRED EMBODIMENT

Figure 1:
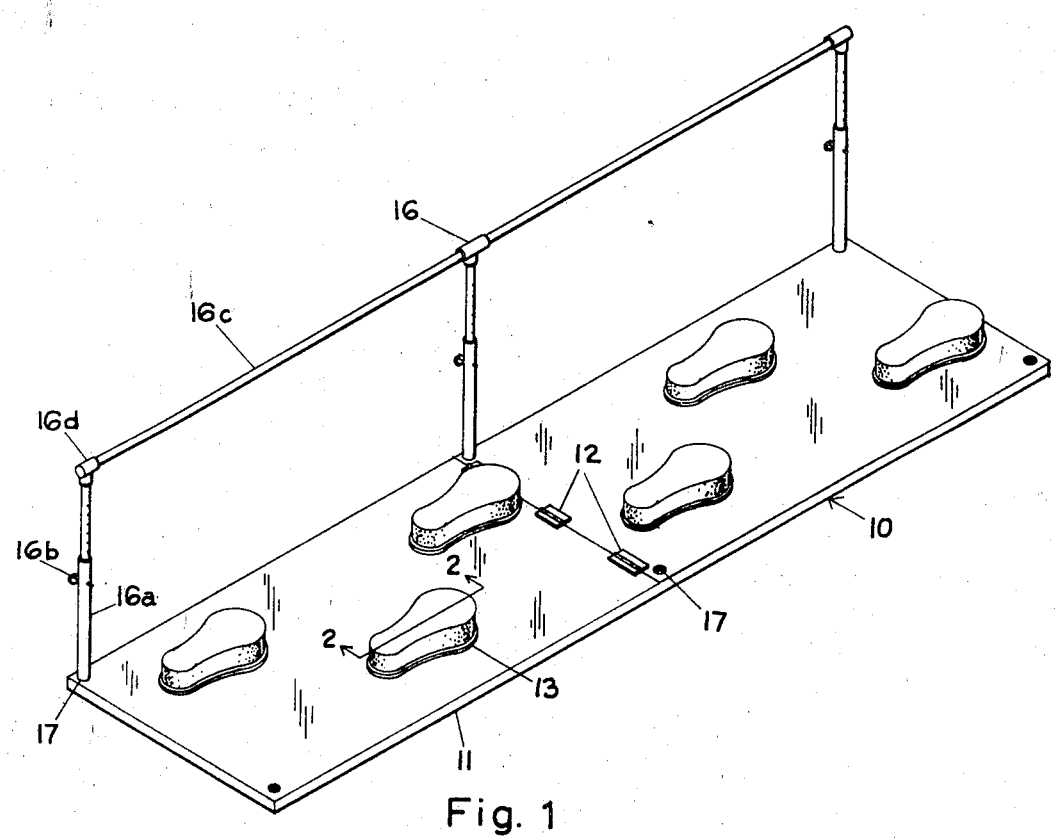
FIG. 1 is an isometric view of a therapeutic walking apparatus embodying my invention.

Referring now more particularly to the drawings wherein like numerals refer to like parts in both views, the therapeutic walking apparatus is referred to generally by numeral 10 in FIG. 1. As shown therein the elongate walkway board 11 is comprised of two halfs foldably connected by hinges 12. Preferably, the walkway should be sturdy yet light enough for easy transporting. A plurality of raised footprint forms 13 are positioned on the flat top surface of the board in any desired walking pattern.

While six footprint forms are shown on the board for illustration, it should be understood that any number can be used and the board should preferably be long enough to facilitate a number of strides and wide enough to accomodate various pattern widths with a safety margin.

Each of the footprint forms 13 extends substantially above the surface of the board to encourage the individual to lift his feet and prevent shuffling. The footprint forms should be raised from 2 to 6 inches and preferably about 3 to 5 inches to prevent shuffling and yet not present a significant unstable "spongy" feeling to one standing on the form.

Figure 2:
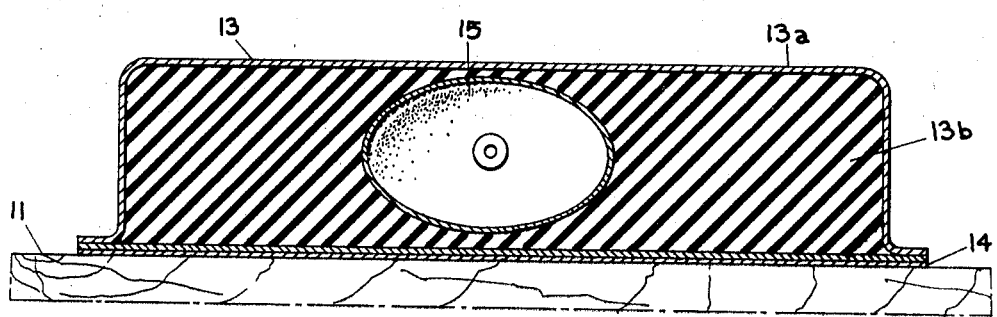
FIG. 2 is a section view taken along line 2—2 of FIG. 1.

As shown in FIG. 2, each of the footprint forms 13 comprises a flexible covering 13a of plastic, cloth or the like enclosing a resilient material 13b such as generally referred to as foam or sponge rubber. The bottom side of the covering has a pressure sensitive means of non-slip attachment to the board for safety such as adhesive, tape, or the like as illustrated at 14 in FIG. 2. The footprint forms are thus removable and can be placed in any desired position on the board.

An air-operated sound-emitting device as shown at 15 in FIG. 2 is embedded in each footprint form for actuation when the device is compressed by someone stepping on the form.

A removable and vertically adjustable handrail assembly such as shown at 16 in FIG. 1 is provided for those individuals initially needing assistance in performing the walking task. The handrail assembly is shown only on one side of the walkway board, however, both sides may be provided with a handrail, if desired. The handrail assembly comprises three telescoping standards 16a having adjusting pins 16b. The standards are secured in upright position by turning them into threaded sockets 17 set in the board. The standards are connected by horizontal members 16c which are turned into threaded connectors such as shown at 16d at the top of the standards. Other suitable means of attachment may be provided. The handrail assemblies, or a part of each of them, may be removed as the individual's development progresses.

It should be understood that this invention is not confined to the particular construction and arrangement of parts herein illustrated and described for exemplification, but embraces all such modified forms thereof as come within the scope of the following claims.

I claim:

1. A therapeutic walking apparatus, comprising:
   a. an elongate walkway board having a flat top surface,
   b. a plurality of footprint forms at least about 3 but less than 6 inches in height, each of said forms comprising a flexible covering enclosing a resilient material, said covering having a pressure sensitive adhesive on the bottom side thereof for releasably attaching said form in spaced relation with each other on the top surface of said board, and
   c. an air-operated sound emitter in each of said footprint forms actuated by compression of said form.

* * * * *